March 28, 1933. P. B. FLYNN 1,902,995
JUMP TRAINING DEVICE
Filed March 11, 1932
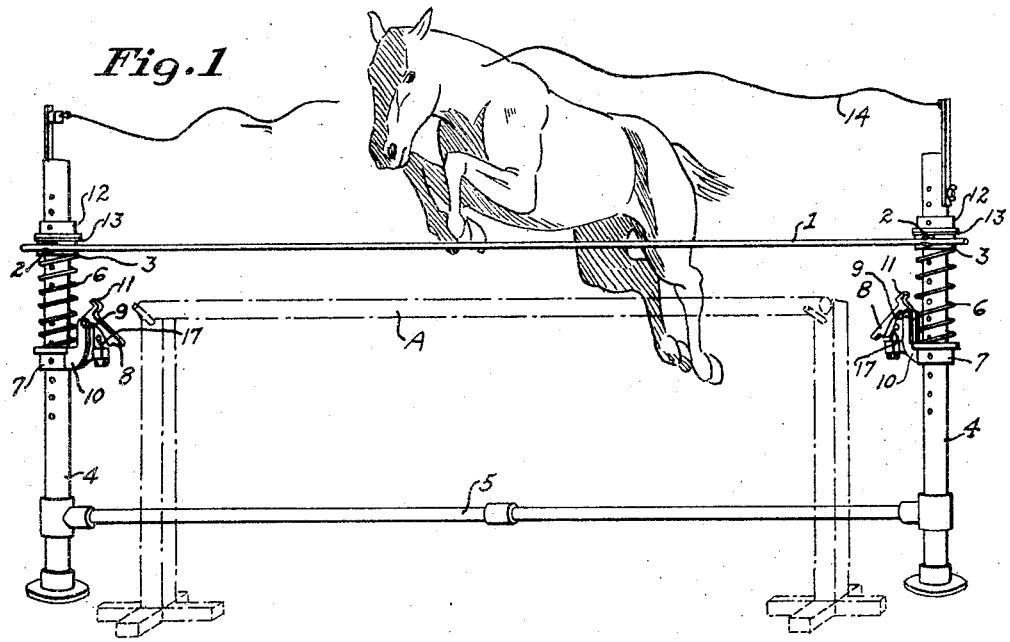
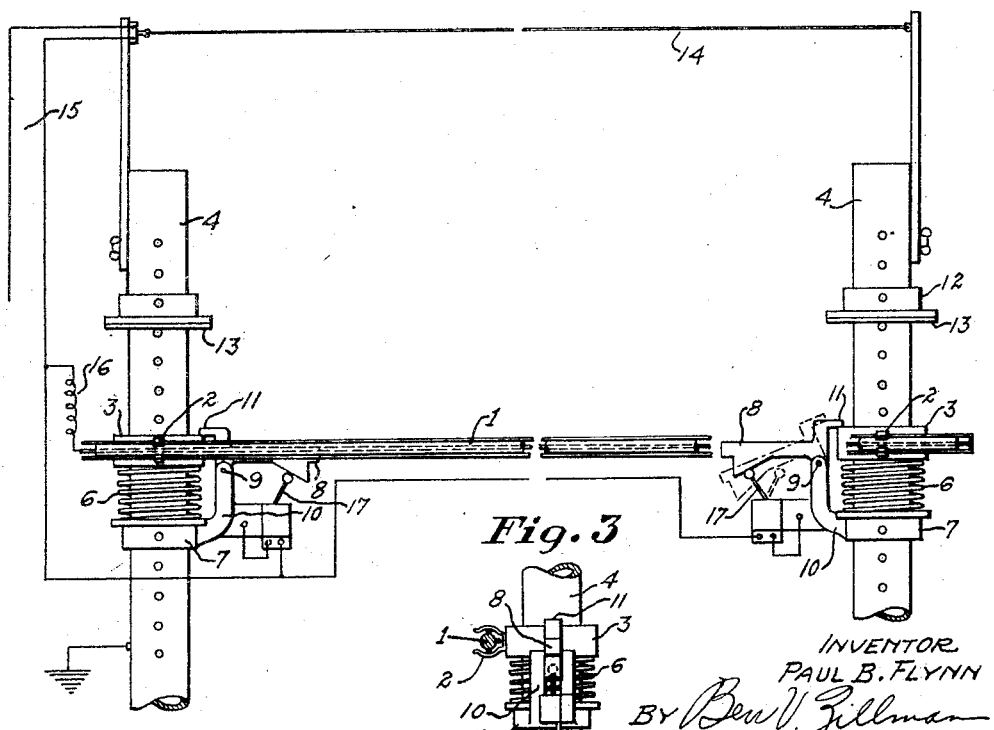
INVENTOR
PAUL B. FLYNN
BY Ben V. Zillman
ATTORNEY Patented Mar. 28, 1933

1,902,995

UNITED STATES PATENT OFFICE

PAUL B. FLYNN, OF ST. LOUIS, MISSOURI

JUMP-TRAINING DEVICE

Application filed March 11, 1932. Serial No. 598,105.

This invention relates to improvements in jump-training devices, and more particularly to a device for training horses and other animals to jump over various types of hurdles, such as bars and the like, with a neat, clean jump and with good form.

My invention has among its objects, a construction wherein there shall be a minimum number of parts, simple in construction and operation, strong and durable, reliable, efficient and satifactory for use wherever found applicable.

It is well known that in the schooling of horses, there are various methods employed for training them to jump over the bars and the like, and to improve their form while so doing, one manner of accomplishing the same being to position the trainer or an assistant adjacent the hurdle and providing him with a pole, so that he can prod the animal at any portion of its body as it passes over the jump. Although this method sometimes accomplishes the desired results while the trainer is so stationed, yet the animal sometimes performs in the proper manner only when the "poler" is there, and hence such an animal is apt to do poorly in competitive events, and where it is not permissible to station "polers".

Therefore, one of the principal objects of my invention is to provide a mechanism which will obviate the necessity of stationing a trainer adjacent the jumping bar, and which is operated by means substantially invisible to the animal.

Another object of my invention is to provide a device which is adjustable and which is operable by the movement of the animal itself passing over the jump bar, and which may be set for operation by a predetermined phase of said jump, so that faulty form of the animal, at either front or rear, may be corrected and properly trained Many other objects and advantages of the construction shown and described herein will be obvious to those skilled in the art to which this invention appertains, from the disclosures herein given.

To this end, my invention consists in the novel construction, arrangement, and combination of parts herein shown and described, and the uses mentioned, and more particularly pointed out in the claims.

In the drawing, wherein like reference characters indicate like or corresponding parts throughout, Figure 1 is a perspective view of my improved mechanism, after it has been operated by the animal passing thereover;

Figure 2 is a front elevation of the same, with the training bar in lowered position, as it appears before being sprung; and Figure 3 is a detail of the latch means and bar-holding means.

Referring more particularly to the drawing, wherein I have illustrated one of the preferred embodiments of my invention, A designates any suitable form of jump bar or the like, forming a hurdle over which it is desired that an animal leap, the same being supported by any style of supports or standards, as shown. In judging jumping over such bars, sloppy jumping is penalized, and the form of the animal, particularly of horses, is emphasized, and hence although the horse may clear the bar without knocking it off its supports, yet any contact of his body or hoofs thereagainst scores against him.

As hereinbefore mentioned, various manual expedients have been resorted to in training or schooling horses to jump in good form, such as the pole, stick or pipe described, and wherein some one must stand adjacent the jump bar to tap the horse as he goes over the jump bar. Such methods are not altogether successful because the horse becomes accustomed to seeing the person at the jump and anticipates being tapped, and hence would jump well only when the trainer was so stationed.

My invention comprises an auxiliary pole or bar, preferably of much lighter construction than the regular jump bar, and acting in co-operation therewith, and operable to move upwardly toward or into contact with the under side of the horse passing over the jump bar, and which requires no attendant at the bar, so that the horse is trained to make good jumps at all times in going over the jump bar, and not only when an attendant is stationed there.

The improved mechanism may take any one of several forms, and it is to be understood that the one described is only one of those forms, the underlying functions of the various co-operating elements being the same in all of the forms. The device therefore consists of the auxiliary bar, means for actuating the same upwardly into contact with the animal, means for holding the bar in lowered position, and the trip means for releasing the bar for its upward movement.

The auxiliary bar 1 may be of any suitable light material, such as bamboo or the like, and is preferably removably held in supported position, as on the spring clips or end brackets 2. The clips are in turn carried by collars 3, mounted for vertical movement on the supporting uprights 4—4, said uprights being spaced apart any predetermined distance, and so held by a sectional connecting element 5. In this manner, the device is portable and can be used within or out of doors, in the field, or at any stone wall or hedge, as it is easily set up or taken down.

The movable bar 1 is provided with means for actuating the same upwardly during the operation of the same, this actuating means being, in this instance, the springs 6. This spring element 6 is placed between the collar 3 and an adjustable but relatively stationary collar 7.

The collars 7 are provided with means for holding the springs compressed between the same and the movable collars, so as to form latches for preventing the lifting of the bar 1, these latches of any suitable form, as the pivoted arms 8, pivoted at 9 to a part 10 carried by the relatively stationary collar 7, said arms 8 having a protuberance or lip 11 to overhang and engage over the relatively movable collar 3 as shown in full lines in Fig. 2, to hold the springs compressed.

Suitable means are provided for releasing the latches at predetermined occasions, as for instance when an animal is passing over the bar, and to accomplish this result, the arms 8 are weighted so as to drop to the dotted line position shown in Fig. 2, when unsupported adjacent their free ends. A short rod, such as the clapper element of an ordinary annunciator bell 12 may be used to normally support the free, weighted end of the arm 8, so that when the annunciator is energized, the clapper will move to one side and permit the arm 8 to drop and permit the compressed spring to expand and carry the bar 1 upwardly.

Another collar 12 may be positioned at any predetermined distance above the lowered position of the rod 1, to form a limit stop for upward travel of the latter, and in order to reduce the noise a cushion 13, of rubber or the like, may be positioned beneath the collar 12, to engage with the movable collar 3.

The means for releasing the latching means should preferably be invisible to the animal making the jump, as for example, by means of a photo-electric cell forming part of the circuit controlling the clapper arm 12 and said circuit being made or broken by the forepart or hindpart of the animal passing over the jump bar, or it is possible to provide a cheaper switch control means by a simple thread 14 positioned at any suitable height across and between the pair of uprights 4—4 and adapted to be broken by a part of the animal as the latter jumps over the jump bar, the thread controlling any suitable form of contact to send the current through the electric conductors there shown, as at 15.

The manner of operation of the device is simple. The movable bar 1 is adjustably positioned with its lower, latched position substantially adjacent and at the same height as the regular jump bar A with which it co-operates, the collar 7 being adjustable along the height of the supports 4 somewhat in the manner shown. The limit collars 12 are set for any predetermined upward movement of the movable bar, as for example four or eight inches, or the like, this distance being adjustable in the same manner as the collar 7.

Now the thread 14 being in place, the jump may be made, and as the horse makes the leap over the bar, the animal breaks the thread which is practically invisible to him, and which in turn releases the latched bar and permits it to be actuated upwardly toward the under side of the animal and contacting with him in the event that every part of him behind the lifted bar is not entirely thereabove.

In order to impress more firmly upon the animal the necessity for clear and clean jumping, the movable bar may be slightly charged, as indicated more clearly in Figs. 2 and 3, the two outer wires being the ground wires, and there being a tension coil 16 in the circuit. Then as the bamboo bar strikes the front or rear legs of the animal it shocks him slightly and causes him to draw up his hocks in under him, and thus enabling him to use all of his muscles to greatest advantage.

It is obvious that the control means for releasing the movable bar may be so placed as to be operable by either the front portion of the horse, or by his rear portion, simply by shifting the thread forwardly or rearwardly relative to the bar, and hence said control means is operable by the movement of the animal passing over the bar, at any predetermined phase of its jump or trajectory.

Having thus described my invention, it is obvious that various immaterial modifications may be made in the same without de- parting from the spirit of my invention; hence I do not wish to be understood as limiting myself to the exact form, arrangement, construction, and combination of parts herein shown and described, or the uses mentioned, except as limited by the state of the art to which this invention appertains or the claims hereto appended.

What I claim as new and desire to secure by Letters Patent is:

1. A jump-training device for animals, comprising an upwardly movable bar, means for actuating said bar upwardly, and control means operable during the jump of said animal over said bar for controlling the upward movement of said bar by said actuating means.

2. A jump-training device for animals, comprising a vertically movable bar adapted to be placed adjacent a relatively stationary jump bar, means for normally actuating said movable bar upwardly past said other bar, latch means for preventing upward movement of said movable bar, and means operable to release said latch means during the jump of the animal over the jump bar and whereby said movable bar moves upwardly towards said animal.

3. A device for training animals to jump over a bar, comprising an upwardly movable bar positioned adjacent said jump bar, means for forcing said bar in its upward movement, means for normally maintaining said bar in lowered position against the force of said last-mentioned means at substantially the height of said jump bar, and means operable during said jump over the stationary bar for releasing said second mentioned means.

4. A device for training animals to jump over a bar, comprising an upwardly movable bar for co-operation with said jump bar, means for forcibly actuating said movable bar upwardly past said jump bar, latch means for holding said movable bar in lowered position at substantially the height of said jump bar, and means operable by said animal during its jump over the jump bar for releasing said latch means to cause said movable bar to be lifted toward the animal.

5. A jump-training mechanism for horses and the like, comprising supports, an upwardly movable bar positioned thereon, means for actuating said bar upwardly, means for latching said bar at lowered position, and means operable by said animal at a predetermined phase of its jump to release said latch means.

6. A device for training animals to jump over a bar, comprising an upwardly movable bar, means for actuating said bar upwardly, latch means for said actuating means, and means substantially invisible to the animal during the jump for releasing said latch means.

7. A jump-training device for animals, comprising an upwardly movable bar, means for actuating the same upwardly, means for holding said bar at its lowered position against the upwardly actuating means, means for electrically charging said bar, and means controlled by a predetermined phase of the jump of said animal over said bar to release said holding means and whereby said rod is actuated upwardly against the under side of said animal while passing thereover.

In testimony whereof he has affixed his signature.

PAUL B. FLYNN.